United States Patent [19]

Holloway et al.

[11] 4,133,644
[45] Jan. 9, 1979

[54] CATALYTIC REACTOR-FRACTIONATOR APPARATUS

[75] Inventors: Richard L. Holloway, Country Club Hills; Robert R. Edison, Olympia Fields; Stephen J. Wachtel, Homewood, all of Ill.

[73] Assignee: Atlantic Richfield Company, Philadelphia, Pa.

[21] Appl. No.: 762,600

[22] Filed: Jan. 25, 1977

Related U.S. Application Data

[62] Division of Ser. No. 578,790, May 19, 1975, Pat. No. 4,033,861.

[51] Int. Cl.² ............................................. B01J 8/02
[52] U.S. Cl. .................................... 422/138; 422/211
[58] Field of Search ................. 23/288 R, 283, 288 H, 23/288 K; 208/254 R, 254 H, 244, 243, 213, 216, 89, 211 (U.S. only)

[56] References Cited

U.S. PATENT DOCUMENTS

| | | | |
|---|---|---|---|
| 3,124,526 | 3/1964 | Butler et al. | 208/216 X |
| 3,347,942 | 10/1967 | Hunter | 23/283 X |
| 3,361,822 | 1/1968 | Schmitt et al. | 23/288 R X |

Primary Examiner—Morris O. Wolk
Assistant Examiner—Roger F. Phillips
Attorney, Agent, or Firm—Frank J. Uxa

[57] ABSTRACT

A method for producing a hydrocarbon material having a reduced nitrogen content involves contacting a nitrogen-containing hydrocarbon feedstock, e.g., crude shale oil, shale oil derived gas oil, mixtures thereof and the like, in at least one reaction zone with a catalyst to polymerize at least a portion of the contained nitrogen compounds, e.g., refractory high boiling nitrogen-containing compounds, and, thereafter, separating, e.g., flashing, the resulting reactor effluent to produce a hydrocarbon material having a reduced nitrogen content relative to the feedstock and effluent. This hydrocarbon material may be advantageously used in hydrocarbon hydrotreating. Also provided is an apparatus comprising a catalytic reactor-fractionator which can be used to carry out the method of the present invention comprising upper and lower rectification sections separated by a catalyst bed, means for introducing feedstock into the lower section and removing bottoms therefrom, and means for removing effluent from the upper section.

5 Claims, 1 Drawing Figure

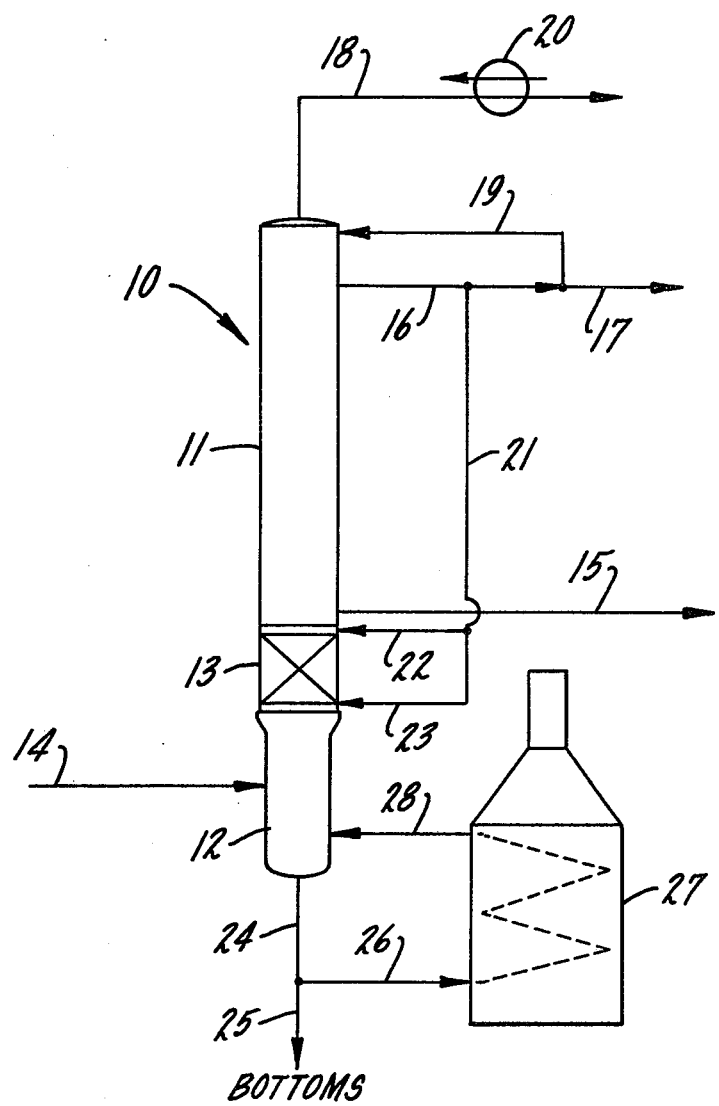

CATALYTIC REACTOR-FRACTIONATOR APPARATUS

This is a division, of application Ser. No. 578,790, filed May 19, 1975 and now U.S. Pat. No. 4,033,861.

This invention relates to methods and apparatus for producing hydrocarbon materials having reduced nitrogen contents. More particularly, the present invention relates to upgrading feedstocks, such as shale-derived oils, by novel methods and apparatus to produce hydrocarbon materials having reduced nitrogen contents relative to the feedstocks.

A great many virgin hydrocarbon materials are contaminated to a greater or lesser degree with nitrogen-containing compounds. For example, petroleum crude oil often contains from about 100 to about 5000 ppm. by weight of nitrogen. Hydrocarbons from other sources, e.g., coal, tar sands, and the like also often contain a significant nitrogen content. Hydrocarbons derived from oil shale have a particularly high nitrogen content, often containing up to about 3% by weight of nitrogen.

The nitrogen present in these various hydrocarbon feedstocks is known to be detrimental to processing these feedstocks into high quality products. For example, the nitrogen contained in these feedstocks is known to poison various catalysts used in hydrocarbon processing. Therefore, it would be advantageous to provide a hydrocarbon material having reduced nitrogen content relative to such feedstock.

Hydrocarbon hydrotreating has become increasingly more important because of the demand for high quality hydrocarbon feedstocks and products, e.g., materials with reduced sulfur and/or nitrogen contents. Broadly, hydrocarbon hydrotreating refers to a process wherein a hydrocarbon material containing a known undesirable contaminant, e.g., sulfur, nitrogen and the like, is contacted with a catalyst in the presence of hydrogen at conditions to form compounds of the undesirable contaminants which can be removed from the hydrocarbon material by conventional means, e.g., simple distillation and the like. However, the nitrogen, e.g., refractory nitrogen, content of the hydrocarbon feedstock to such hydrocarbon hydrotreating often has an adverse effect on the desired hydrotreating reactions. In order to increase hydrocarbon hydrotreating process efficiency, it would be advantageous to provide a hydrocarbon material to such hydrotreating having a reduced nitrogen, e.g., refractory nitrogen, content.

Therefore, one object of the present invention is to provide improved methods and apparatus for processing nitrogen-containing hydrocarbon feedstocks.

An additional object of the present invention is to provide improved methods and apparatus for producing hydrocarbon materials having reduced nitrogen contents.

A further object of the present invention is to provide an improved hydrocarbon hydrotreating process. Other objects and advantages of the present invention will become apparent hereinafter.

A method has now been discovered for producing a hydrocarbon material having a reduced nitrogen content from a nitrogen-containing hydrocarbon feedstock, preferably containing at least about 1000 ppm. and more preferably at least about 3000 ppm., by weight of nitrogen, which comprises (1) contacting the feedstock with a catalyst effective to promote the polymerization of at least a portion of the nitrogen-containing compounds in the feedstock at conditions sufficient to polymerize at least a portion of the nitrogen-containing compounds and form an effluent; and (2) separating the effluent into a hydrocarbon fraction enriched in the polymerized nitrogen-containing compounds and a hydrocarbon material having a reduced nitrogen content relative to the feedstock and effluent.

Further, an improved hydrocarbon hydrotreating process has been discovered. Hydrocarbon hydrotreating refers to a process wherein a hydrocarbon material containing at least one component selected from the group consisting of sulfur, nitrogen and mixtures thereof is contacted with hydrogen in the presence of a hydrocarbon hydrotreating catalyst at conditions such that hydrogen forms compounds with at least one of these contaminants. A product having a reduced content of at least one of these contaminants relative to the hydrocarbon material is recovered using conventional means, e.g., flashing, simple distillation and the like. Improved results, e.g., improved hydrocarbon hydrotreating catalyst activity and activity stability, have been achieved by producing the hydrocarbon material to be hydrotreated by a process which comprises (1) contacting a nitrogen-containing hydrocarbon feedstock with a catalyst effective to promote the polymerization of at least a portion of the nitrogen-containing compounds in the feedstock at conditions sufficient to polymerize at least a portion of the nitrogen-containing compounds and form an effluent; and (2) separating the effluent into a hydrocarbon fraction enriched in the polymerized nitrogen-containing compounds and a hydrocarbon material having a reduced nitrogen content relative to the feedstock and effluent.

In addition, an improved apparatus for producing a hydrocarbon material having a reduced nitrogen content from a nitrogen-containing hydrocarbon feedstock, e.g., for carrying out the above nitrogen content reducing method of the present invention, has been found. This apparatus comprises (1) a first zone wherein at least one lower boiling hydrocarbon product having a reduced nitrogen content relative to the feedstock is purified; (2) at least one first outlet means in fluid communication with the first zone for withdrawing the lower boiling hydrocarbon product; (3) a second zone from which at least one higher boiling hydrocarbon product enriched in nitrogen content relative to the feedstock is withdrawn; (4) at least one second outlet means in fluid communication with the second zone for withdrawal of the higher boiling hydrocarbon product; (5) at least one feedstock inlet means in fluid communication with the second zone; and (6) at least one reaction zone interspersed between the first and second zones wherein at least a portion of the feedstock is contacted, preferably in the essential absence of added free molecular hydrogen, with a catalyst effective to promote the polymerization of at least a portion of the nitrogen-containing compounds in the feedstock at conditions sufficient to polymerize at least a portion of the nitrogen-containing compounds.

With regard to the drawing, a schematic illustration of one preferred embodiment of the present apparatus is shown.

As described above, the present invention is concerned with novel methods and apparatus for processing a nitrogen-containing hydrocarbon feedstock to produce hydrocarbon material having reduced nitrogen content, e.g., for subsequent hydrotreating. Often, the Conradson Carbon Residue concentration and arsenic contents of the hydrocarbon feedstock are also reduced using the methods and apparatus of the present invention. The present invention has been found to provide particularly useful methods and apparatus for processing shale derived oils to hydrocarbon materials so that the hydrotreating of such materials may be carried out more efficiently.

Various hydrocarbon feedstocks, e.g., crude shale oil, shale oil derived fractions and the like, often contain a relatively high concentration of difficult to remove nitrogen-containing compounds. Certain of these nitrogen-containing compounds are relatively high molecular weight, e.g., at least about 200, have somewhat complex chemical structures and are usually referred to as refractory nitrogen-containing compounds because of their resistance to thermal decomposition. When such feedstocks or fractions of such feedstocks are subjected to catalytic hydrocarbon hydrotreating, the activity of the hydrotreating catalyst, e.g., measured by the hydrodenitrogenation rate, that is the rate at which contained nitrogen reacts with free molecular hydrogen to form compounds, such as ammonia, which can be removed using conventional procedures, is adversely affected by the presence of such refractory nitrogen-containing compounds. The present invention provides methods and apparatus which are particularly applicable for reducing the nitrogen content, e.g., refractory nitrogen content, of hydrocarbon feedstocks to form hydrocarbon materials which may be more efficiently hydrotreated.

By "polymerization of nitrogen-containing compounds" is meant the chemical combining of at least one nitrogen-containing compound with another compound, e.g., another nitrogen-containing compound, hydrocarbon compound, sulfur-containing compound and the like, present in the hydrocarbon feedstock to form at least one nitrogen-containing compound having a higher molecular weight than the original nitrogen-containing compound. The hydrocarbon fraction enriched in the polymerized nitrogen-containing compounds recovered from the present separation step, which is often normally liquid and more preferably comprises from about 5% to about 20% or more by weight of the feedstock, may be useful as a feedstock component to a conventional coking, preferably delayed coking, operation.

An additional advantage of the process described herein for hydrocarbon hydrotreating is that the concentrations of certain metals and Conradson Carbon Residue concentration of the hydrocarbon material of reduced nitrogen content from the separation step are often reduced significantly. Thus, metals, such as arsenic, are concentrated in the higher boiling fraction or fractions enriched in the polymerized nitrogen-containing compounds from the separation step which may be sent to coking. Lowering the concentrations of metals, such as arsenic, and Conradson Carbon Residue in the hydrocarbon material to be hydrotreated provides improved hydrotreating catalyst activity stability, e.g., the useful life of the catalyst is lengthened. "Conradson Carbon Residue" is a term well known in the art and is obtained using a method which involves heating a sample to redness in a closed crucible and weighing the carbon residue. The complete testing procedure may be found in ASTM Test D-180-52.

The nitrogen-containing hydrocarbon feedstocks useful in the present invention may be derived from various sources, for example, petroleum, coal, tar sands, oil shale and the like. These feedstocks may be obtained using procedures which are conventional and well known in the art. Often the feedstocks boil primarily in the range from about 200° F. to about 1000° F., preferably from about 350° F. to about 1000° F. The nitrogen content of suitable feedstocks is often at least about 1000 ppm. (parts per million, based on weight), preferably at least about 3,000 ppm. and more preferably at least about 5,000 ppm.

Although the present invention may be applied to various nitrogen-containing feedstocks, it finds particular applicability with feedstocks which are derived from oil shale. Crude shale oil may be obtained by retorting oil shale in a conventional, above-ground retort, such as the Bureau of Mines gas combustion retort. Crude shale oil is often a highly unsaturated oil, and contains hydrocarbons and organic materials composed of hydrocarbons in combination with sulfur, nitrogen and oxygen. Crude shale oil often boils primarily in the range of about 350° F. to about 1000° F. Among typical characteristics of crude shale oil are: about 17° to about 22° API gravity, about 150 to about 600 SUS viscosity at 100° F. a pour point of at least about 75° F., about 0.2% to about 5% by weight of sulfur, about 0.5% to about 3% by weight of nitrogen, and a carbon to hydrogen weight ratio of about 6 to about 8. Shale gas oils may be produced by fractional distillation of a crude shale oil to form a gas oil fraction, e.g., boiling primarily from about 350° F. to about 1000° F. In addition, shale oil derived gas oils may be obtained as a by-product of conventional coking of crude shale oil or the higher boiling fraction, e.g., residuum, thereof. Conventional petroleum refinery catalytic reforming and cracking processes are often inefficient when used to process feedstocks derived from such crude shale oil because of excessive carbon or coke formation, which is ordinarily attributed to the high nitrogen and sulfur contents of the oils.

According to the present invention, the nitrogen-containing hydrocarbon feedstocks, e.g., shale oil fractions such as shale derived naphthas and gas oils, are contacted in at least one reaction zone with a catalyst in order to effect polymerization of at least a portion of the nitrogen, e.g., refractory nitrogen, -containing compounds therein. In preferred embodiments, the reaction zone or zones containing the catalyst is maintained at temperatures in the range from about 400° F. to about 1000° F., more preferably from about 500° F. to about 800° F., reactor pressures in the range from about 0 psig. to about 3000 psig. or more, preferably from about 300 psig. to about 3,000 psig., and a WHSV (weight hourly space velocity) in the range from about 0.25 to about 5.0. In an additional preferred embodiment, the present contacting takes place in the presence of added free molecular hydrogen in an amount from about 50 to about 10,000, more preferably from about 300 to about 7000, standard cubic feet (s.c.f.) per barrel (b) of nitrogen-containing hydrocarbon feedstock. The polymerized nitrogen-containing compounds concentrate in the higher boiling fraction which is separated from the hydrocarbon material of reduced nitrogen content.

The catalyst material in the reaction zone or zones may be any catalyst which is effective to polymerize at least a portion of the nitrogen compounds present in the feedstock to such reaction zone or zones. It is preferred that the catalyst comprise a catalytically-effective amount of at least one metal selected from the group consisting of Group IB metals, Group IIB metals, Group III metals, Group IV metals, Group V metals, Group VI metals, Group VIII metals, the rare earth metals and mixtures thereof. Such metals include, for example, copper, silver, zinc, cadmium, aluminum, gallium, titanium, zirconium, tin, vanadium, antimony, molybdenum, tungsten, manganese, iron, cobalt, nickel, platinum, palladium, iridium, osmium, rhodium, ruthenium, lanthanium, cerium, actinium and thorium. Particularly preferred catalytic metals include iron, cobalt, nickel, aluminum, vanadium, molybdenum and mixtures thereof. These metals may be present in the catalysts useful in the present invention as free metals, in a combined form such as metal salts, e.g., oxides, sulfides and the like, in alloys, e.g., carbon steel, stainless steel and the like, and mixtures thereof. An especially preferred catalyst comprises iron oxide, e.g., $Fe_2O_3$.

In an additional preferred embodiment, the catalyst effective to promote the polymerization of nitrogen-containing compounds comprises from about 30% to about 99.5% by weight of a support and a catalytically-effective, minor amount of at least one of the above-noted metals.

The present polymerization catalysts can be prepared using conventional methods well known in the art. For example, if one or more of the catalytically effective metals are to be used without a support, they should be formed to provide catalysts having a high surface to volume ratio. High surface area catalysts allow more efficient contact with the hydrocarbon feedstock being processed. For example, the metals, e.g., iron and iron alloys, can be formed into conventional packing shapes, e.g., berl saddles, raschig rings and the like, or may be used in the form of single strands of metal woven together in a mesh, such as steel wool.

As noted above, in a preferred embodiment, the polymerization catalysts of the present invention include from about 30% to about 99.5% by weight of a support. Any conventional catalyst support is suitable in the present application. Among the supports which have been found to be effective for use in the present invention are those selected from the group consisting of refractory inorganic oxides, e.g., alumina, silica, silica-alumina, magnesia, zirconia, boria, thoria, zinc oxide and the like, acid activated clays, kieselguhr, fullers earth, pumice, bauxite and mixtures thereof.

The catalytically effective metals may be added to such supports using conventional procedures well known in the art. Such procedures include co-precipitation with a support, ion exchange with a support, impregnation of the support with a metal-containing compound and the like.

In one preferred embodiment, the support material, e.g., alumina, is contacted with at least one metal-containing compound, e.g., in an aqueous solution, to form a metal-containing material which includes an amount of such metal so that the final catalyst prepared therefrom comprises a catalytically effective amount of the metal. For example, if one or more Group VIB metals are used, they are preferably present in amounts from about 5% to about 40%, more preferably from about 10% to about 30%, by weight of the total catalyst (calculated as the weight of the Group VIB metal oxide). The Group IB, IIB, IIIB, IVB, VB, VIA and Group VIII metals and rare earth metals are preferably present in an amount of from about 0.5% to about 30%, more preferably from about 0.5% to about 25% by weight of the total catalyst (calculated as the weight of the free metal).

The following illustrates the preparation of a iron-containing alumina supported catalyst. A support material, e.g., of substantially pure alumina in the form of extrudates, can be contacted with an aqueous solution of ferric nitrate, e.g., for a period of about 15 hours to about 20 hours. The resulting metal-containing material can then be dried, as for example, at a temperature of about 100° C. to about 130° C., and then calcined, e.g., at a temperature of from about 800° F. to about 1200° F. The above procedure can be used to prepare a nickel-containing catalyst by substituting nickel nitrate for the ferric nitrate. As noted above, other metals may be added to or combined with the support using conventional procedures well known in the art to provide a catalytically effective amount of such metal or metals.

The polymerization catalyst, whether supported or unsupported, may be present in the reaction zone in the form of particles, e.g., extrudates, pills, tablets, spheres and the like. The particle size is not critical to the present invention although increased surface area does provide increased contacting efficiency. For example, the catalyst may be in a particulate form such that at least about 50 weight percent thereof has a large cross-sectional dimension (i.e., the diameter of a particle if it is round or the longest dimension through the center of a particle if it is not round) of no larger than about one-quarter inch. The catalyst, supported or unsupported, often has a surface area of at least one square meter per gram and can have a surface area of at least fifty square meters per gram depending upon the intimacy of contacting.

After contacting the hydrocarbon feedstock with the catalyst to effect nitrogen-containing compound polymerization, the resulting effluent is subjected to a separation step in which at least a portion of the polymerized nitrogen-containing compounds are concentrated into at least one hydrocarbon fraction, and a hydrocarbon material of reduced nitrogen content relative to the feedstock and effluent is recovered. In one preferred embodiment, the resulting effluent is flashed to form a normally liquid bottom hydrocarbon fraction concentrated in polymerized nitrogen-containing compounds and an overhead product hydrocarbon material of reduced nitrogen content relative to the feedstock and effluent. The hydrocarbon fraction enriched in polymerized nitrogen-containing compounds is preferably normally liquid and preferably comprises from about 1% to about 20% or more, more preferably from about 5% to about 20%, based on the weight of the feedstock.

In processing shale oil derived gas oils having an end boiling point in the range from about 925° F. to about 1000° F. using the present invention, preferably substantially all materials boiling below about 900° F. are removed overhead in the separation step to form the hydrocarbon material of reduced nitrogen content.

The conditions sufficient to separate the effluent from the contacting step are conventional, well known in the art and are not critical to the present invention. For example, when the feedstock is a shale oil derived gas oil having an end boiling point within the range from about 925° F. to about 1000° F., these conditions may include temperatures in the range from about 500° F. to about 800° F. and pressures in the range from about 60 mm./Hg., to about 200 mm./Hg. Separation conditions depend on, for example, the boiling range and distribution of the effluent from the contacting step, the nitrogen content and distribution of this effluent, the degree of separation desired and the like factors.

In any event, at least a portion of the hydrocarbon material of reduced nitrogen content recovered from the separation step may be sent to conventional hydrocarbon hydrotreating. Hydrotreating such a hydrocarbon material of reduced nitrogen content provides outstanding benefits, e.g., improved hydrotreating catalyst activity and activity stability, relative, for example, to hydrotreating the original hydrocarbon feedstock, e.g., shale oil derived gas oil, or the effluent from the present contacting step.

The hydrocarbon hydrotreating step of the present invention is preferably carried out by contacting the hydrocarbon material of reduced nitrogen content in at least one reaction zone over one or more metal-containing catalysts in the presence of free molecular hydrogen at hydrocarbon hydrotreating conditions. Examples of suitable catalytic metal components include the members of Group VIB, e.g., chromium, molybdenum and tungsten; vanadium and/or the Group VIII iron group and platinum group metals, e.g., iron, cobalt, nickel, platinum, palladium, iridium, osmium, rhodium, ruthenium and mixtures thereof. The catalytic metals can be present in the final hydrotreating catalyst as the free metals or in combined form, such as oxides and sulfides. Preferably, the final catalyst contains catalytically effective amounts of at least one Group VIB metal and at least one Group VIII iron-group metal. Especially preferred catalysts contain nickel, cobalt and mixtures thereof. The Group VIB metals are preferably present in amounts of from about 5% to about 40%, more preferably from about 10% to about 30%, by weight of the total catalyst (calculated as the Group VIB metal oxide). The Group VIII iron-group metals are preferably present in an amount of from about 2% to about 15%, more preferably from about 4% to about 10%, by weight of the total catalyst (calculated as the free metal). When they are used, the Group VIII platinum group metals preferably are present in an amount from about 0.01% to about 2%, more preferably from about 0.05% to about 1%, by weight of the total catalyst (calculated as the free metal). Metals and/or metal compounds in addition to the platinum group metals such as rhenium, germanium, tin and the like, may be included in the final catalyst to improve the properties of the composition.

The hydrotreating catalysts often include a major amount of at least one support material, such as those recited above for use with the polymerization catalysts. Preferably the support comprises alumina. The specific hydrotreating catalyst employed is not critical to the present invention. Methods of making such hydrotreating catalysts are conventional and well known in the art.

Hydrocarbon hydrotreating is, of course, well known to the prior art and effects hydroconversion of the hydrocarbon material of reduced nitrogen content by subjecting it to catalytic reaction in the presence of free molecular hydrogen. Preferably, this process is carried out by contacting this material at a temperature of about 500° F. to about 800° F. and a pressure of about 300 psig. to about 3000 psig. with a hydrocarbon hydrotreating catalyst, preferably at least one fixed bed of such catalyst, in the presence of free molecular hydrogen. The ratio of hydrogen to hydrocarbon material entering the initial hydrocarbon hydrotreating reaction zone preferably ranges from about 500 s.c.f./b. to about 15000 s.c.f./b.

Referring now to the drawing, the present apparatus, referred to generally as 10, includes a first zone 11, a second zone 12, and placed therebetween, a reaction zone 13. Both first zone 11 and second zone 12 may be viewed as portions of a conventional fractionation column. Thus, each of the zones 11 and 12 may provide for at least one equilibrium stage of separation according to boiling point. Zones 11 and 12 may contain conventional packing and/or one or more of other conventional devices, i.e., bubble cap trays, valve trays, sieve trays and the like, to aid in effecting the desired separation.

Reaction zone 13 contains at least one catalyst, e.g., as described herein, effective to promote the polymerization of at least a portion of the nitrogen-containing compounds in the feedstock from line 14. Reaction zone 13 is operated at conditions to effect such polymerization. One particularly preferred catalyst material for use in the reaction zone 13 is iron oxide or steel packing, especially stainless steel packing. Stainless steel is a generic term applied to certain alloys containing iron, chromium and nickel.

The functioning of apparatus 10 is illustrated as follows. Nitrogen-containing hydrocarbon feedstock, e.g., shale oil derived gas oil, enters second zone 12 through line 14. Much of this feedstock passes into reaction zone 13 where at least a portion of the nitrogen-containing compounds in the feedstock are polymerized to higher boiling compounds. The reaction zone 13 itself provides a certain degree of separation so that the hydrocarbon material leaving reaction zone 13 and entering first zone 11 has a reduced nitrogen content and a slightly reduced boiling point relative to the feedstock entering apparatus 10 through line 14. Thus, a product of reduced nitrogen content may be taken from the lower portion of the first zone 11 through line 15.

In the embodiment shown in the drawing, two additional lower boiling hydrocarbon products are withdrawn from first zone 11. A liquid product is withdrawn via lines 16 and 17 and a gaseous product is withdrawn in line 18. At least a portion of the liquid product in line 16 may be recycled through line 19 back to first zone 11 to aid in effecting the desired separation. The gaseous product in line 18 is heat exchanged in cooler 20 and sent elsewhere for further processing, e.g., further separation and recovery.

All three products from the first zone 11, i.e., gaseous product in line 18 and liquid products in lines 15 and 17, are lower boiling than the hydrocarbon feedstock from line 14 and have reduced nitrogen contents. The liquid products, in particular the product from line 15, may be advantageously processed using the hydrotreating procedures described herein. In addition, a portion of the liquid product from line 16 may be periodically sent via lines 21 and 22 or 23 to the proximity of the reaction zone 13. Introduction of this liquid product through lines 22 and/or 23 has been found to relieve the pressure drop buildup across the reaction zone 13 occasioned by, for example, accumulation of polymer on the catalyst contained in reaction zone 13. The frequency and duration of flow through lines 22 and/or 23 depends on, for example, the rate and absolute level of pressure drop buildup across reaction zone 13.

A substantial portion of the polymerized nitrogen-containing compounds produced in reaction zone 13 enter second zone 12. Such polymerized nitrogen-containing compounds, along with other higher boiling fractions of the feedstocks from line 14, flow through lines 24 and 25 and become the higher boiling or bottoms product from the apparatus 10. This bottoms product, which is enriched in nitrogen content relative to the feedstock in line 14, is sent for further processing, e.g., conventional coking procedures, to produce useful products. A portion of the material in line 24 is sent via line 26 to reboiler 27, e.g., a direct fired heater, and then via line 28 to second zone 12. Reboiler 27 provides the required heat necessary, for example, to effect the desired separation in apparatus 10.

The following examples clearly illustrate the present invention. However, these examples are not to be interpreted as specific limitations on the invention.

EXAMPLES 1 TO 6

These examples illustrate certain of the advantages of the present invention.

A shale oil derived gas oil feedstock boiling in the range of 400°–925° F. was contacted with an $Fe_2O_3$ on alumina catalyst under varied conditions of pressure, WHSV, and temperature to determine the effect of the catalyst on the feedstock. A summary of the properties of the shale oil derived gas oil used is as follows:

| | |
|---|---|
| ° API | 21.6 |
| Sulfur content, wt. % | 0.68 |
| Nitrogen content, wt. % | 2.18 |
| Oxygen content, wt. % | 0.97 |
| Hydrogen content, wt. % | 11.2 |

The catalyst was prepared using conventional techniques and contained about 25% by weight of $Fe_2O_3$ on an alumina support. The catalyst was in the form of extrudate cylinders having a diameter of about 1/16 inch and a length of about 1/16 to 1/8 inch. The following table shows the conditions at which such catalyst contacting was carried out.

TABLE 1

| Run No. | Pressure, psig. | WHSV | Temperature, ° F. |
|---|---|---|---|
| 1 | 2000 | 4 | 700 |
| 2 | 2000 | 2 | 700 |
| 3 | 2000 | 1 | 700 |
| 4 | 2000 | 2 | 800 |
| 5 | 1000 | 2 | 700 |

TABLE 1—continued

| Run No. | Pressure, psig. | WHSV | Temperature, ° F. |
|---|---|---|---|
| 6 | 1000 | 1 | 700 |

The pressure in the reaction zone was maintained using hydrogen at a flowrate of 5,000 s.c.f./b. of feedstock. A portion of the nitrogen-containing compounds in the shale oil derived gas oil feedstock was polymerized at each of the above set of conditions.

Composite samples of the effluent from these catalyst contactings were then vacuum flashed at 600° F. and 80 mm./hg. Two flashes at differing overhead/bottoms ratios were carried out as summarized in the following table.

TABLE II

| | VACUUM FLASH STREAM PROPERTIES | | | | | |
|---|---|---|---|---|---|---|
| | FLASH #1 600° F., 80 mm Hg | | | FLASH #2 600° F., 80 mm Hg | | |
| | FEED | OVERHEAD | BOTTOMS | FEED | OVERHEAD | BOTTOMS |
| SAMPLE NO. | 1 | 2 | 3 | 4 | 5 | 6 |
| Wt.% Feed | — | 90.0 | 10.0 | — | 85 | 15 |
| API | 21.6 | 21.4 | 10 | 20.6 | 21.1 | 12.5 |
| %N | 2.18 | 2.13 | 2.51 | 2.16 | 2.11 | 2.45 |
| %S | .684 | .689 | .637 | .728 | .713 | .639 |
| %O | .97 | 1.02 | 1.17 | 0.94 | — | — |
| %H | 11.2 | 11.29 | 10.39 | 11.23 | 11.16 | 10.61 |
| Arsenic, ppm | 2 | 0 | 29 | 2 | 0 | 30 |
| Distillation, Vol.% | | | | | | |
| IBP | 348 | 354 | — | 359 | 346 | — |
| 10 | 446 | 445 | — | 455 | 446 | — |
| 50 | 657 | 639 | — | 671 | 640 | — |
| 90 | 877 | 841 | — | 885 | 834 | — |
| 95 | 933 | 881 | — | 938 | 871 | — |
| EP | 1069 | 989 | — | 1063 | 956 | — |
| Conradson Carbon Residue, Wt.% | 0.85 | 0.23 | 7.27 | 0.61 | 0.16 | 4.84 |

Both of the feed materials and overhead products from the flashes described above were subjected to conventional hydrocarbon hydrotreating. The hydrotreating catalyst employed was a commercially available alumina supported catalyst including about 2.5% by weight of nickel (calculated as the elemental metal) and about 15.8% by weight of molybdenum (calculated as $MoO_3$). Hydrotreating occurred at the following conditions:

| | |
|---|---|
| Temperature, ° F. | 710 |
| Pressure, psig. | 2500 |
| $H_2$/Hydrocarbon, s.c.f./b. | 8000 |
| WHSV | 0.8 |

The hydrocarbon material after being contacted with the hydrotreating catalyst was cooled and flashed to remove gaseous hydrogen and other light materials and produce a liquid product.

Selected results of these hydrotreating tests were as follows:

| to Hydro-treating Feed Material | (1) Nitrogen Content Prior to Hydrotreating, Wt. PPM | (2) Nitrogen Content After Hydrotreating, Wt. PPM | Ratio of (1) to (2) |
|---|---|---|---|
| Flash #1 Feed | 21,800 | 840 | 25.9 |
| Flash #1 Overhead Product | 21,300 | 575 | 37.0 |
| Flash #2 Feed | 21,600 | 1500 | 14.4 |
| Flash #2 Overhead | 21,100 | 650 | 32.5 |

| Feed Material | (1) Nitrogen Content Prior to Hydro- treating, Wt. PPM | (2) Nitrogen Content After Hydro- treating, Wt. PPM | Ratio of (1) to (2) |
|---|---|---|---|
| Product | | | |

These data clearly demonstrate certain of the outstanding advantages of the present invention. Thus, the flash overhead products, which have been subjected to both the contacting and separation steps of the present process, provide hydrotreated products having reduced nitrogen contents relative to hydrotreated products derived from the flash feeds. This is particularly surprising since the nitrogen contents of the flash overhead products are only slightly reduced relative to the nitrogen contents of the flash feeds. Clearly, the present process provides hydrocarbon materials which can be hydrotreated with improved efficiency, e.g., with an improved rate of hydrodenitrogenation.

EXAMPLE 7

A nominal 400° to 800° F. cut of shale oil obtained by conventionally retorting solid oil shale contains about 2.5% by weight of nitrogen. This shale oil fraction is contacted with a commercially available nickel-molybdenum containing catalyst. This catalyst contains about 3.2% by weight of nickel as oxide and about 15.1% by weight of $MoO_3$ with the remainder of the catalyst being alumina. The catalyst is placed in a reactor bed. The mixture of 10% by volume of hydrogen sulfide in hydrogen is contacted with the catalyst at 400° F. for about 4 hours to convert the nickel and molybdenum oxides to sulfides. The reactor is then pressured with molecular hydrogen to 2000 psig. and the abovedescribed shale oil is charged to the reactor at the following conditions:

| | |
|---|---|
| Temperature, ° F. | 720 |
| WHSV | 10 |
| Pressure, psig. | 2000 |
| H$_2$/Hydrocarbon, s.c.f./hr. | 1000 |

Samples of the effluent from the reaction zone are cooled and condensed. A portion of the nitrogen-containing compounds in the shale oil fraction are polymerized during the above-described contacting.

The effluent is sent to a distillation column where an overhead product having an end boiling point of about 780° F. is recovered. A liquid bottoms product is also recovered. This overhead product is hydrotreated using a conventional catalyst. Such processing provides a valuable hydrocarbon product from the hydrocarbon hydrotreating having relatively low, i.e., less than 1000 ppm, content of nitrogen.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A reactor-fractionation column for producing a hydrocarbon material having a reduced nitrogen content from a nitrogen-containing hydrocarbon feedstock comprising:
   a. an upper rectification section including at least one equilibrium stage of separation according to boiling point wherein at least one lower boiling product having a reduced nitrogen content relative to said feedstock is purified;
   b. at least one outlet means in fluid communication with said first section for withdrawing said lower boiling product;
   c. a lower rectification section from which at least one higher boiling product enriched in nitrogen content relative to said feedstock is withdrawn, said second section including reboiler means to provide at least a portion of the heat for said purification;
   d. at least one bottoms outlet means in fluid communication with said lower rectification section for withdrawal of said higher boiling product;
   e. at least one feedstock inlet means in fluid communication with said lower rectification section; and
   f. at least one catalytic reaction section containing a catalyst bed between and in communication with said upper and lower sections wherein at least a portion of said feedstock is contacted in the presence of said catalyst effective to promote the polymerization of at least a portion of the nitrogen-containing compounds in said feedstock at conditions sufficient to polymerize at least a portion of said nitrogen-containing compounds.

2. The reactor-fractionation column of claim 1 which further comprises transport means to provide fluid communication between at least one of said first outlet means and said reaction section wherein a portion of lower boiling product is transported to said reaction section.

3. The reactor-fractionation column of claim 2 wherein more than one outlet means are provided in fluid communication within said upper recitification section, each of said outlet means being placed at a different level for withdrawing more than one lower boiling product.

4. The reaction-fractionation column of claim 2 wherein said catalyst comprises iron.

5. The reaction-fractionation column of claim 2 wherein said catalyst comprises iron oxide supported on aluminum.

* * * * *